United States Patent
Sodo

(10) Patent No.: US 10,720,772 B2
(45) Date of Patent: Jul. 21, 2020

(54) FILTERING ARRANGEMENT HAVING A THREE PHASE LCL POWER SUPPLY COMMON MODE FILTER

(71) Applicant: Vacon Oy, Vaasa (FI)

(72) Inventor: Nicklas Sodo, Vaasa (FI)

(73) Assignee: Vacon Oy, Vaasa (FI)

( * ) Notice: Subject to any disclaimer, the term of this patent is extended or adjusted under 35 U.S.C. 154(b) by 0 days.

(21) Appl. No.: 15/777,936

(22) PCT Filed: Dec. 17, 2015

(86) PCT No.: PCT/EP2015/080188
§ 371 (c)(1),
(2) Date: May 22, 2018

(87) PCT Pub. No.: WO2017/102005
PCT Pub. Date: Jun. 22, 2017

(65) Prior Publication Data
US 2019/0013671 A1  Jan. 10, 2019

(51) Int. Cl.
*H02J 3/24* (2006.01)
*H02M 1/12* (2006.01)
(Continued)

(52) U.S. Cl.
CPC ............... *H02J 3/24* (2013.01); *H02M 1/126* (2013.01); *H02M 5/4585* (2013.01); *H02M 3/04* (2013.01);
(Continued)

(58) Field of Classification Search
CPC ...... H02M 1/126; H02M 5/4585; H02M 3/04; H02M 7/5387; H02M 2001/123
See application file for complete search history.

(56) References Cited

U.S. PATENT DOCUMENTS 5,477,091 A    12/1995  Fiorina et al.
2015/0103570 A1*  4/2015  Marahrens ............ H02M 7/003
                                                  363/44

FOREIGN PATENT DOCUMENTS

CN    101001051 A     7/2007
CN    101053284 A    10/2007
(Continued)

OTHER PUBLICATIONS

International Search Report for PCT Serial No. PCT/EP2015/080188 dated Sep. 7, 2016.

*Primary Examiner* — Kyle J Moody
*Assistant Examiner* — Lakaisha Jackson
(74) *Attorney, Agent, or Firm* — McCormick, Paulding & Huber PLLC

(57) ABSTRACT

A filtering arrangement for a system including a power electronics device and an external power storage/discharge element, which power electronics device includes a power module and a three-phase filter between the AC power terminals of the power module and the supplying AC power grid, and which power module includes a DC intermediate power bus, and which three-phase filter between the AC power terminals and the supplying AC power grid includes two three-phase inductors, and which external power storage/discharge element has two DC power terminals which are connected to the DC intermediate power bus of the power electronics device. The filtering arrangement includes a common mode inductor which is connected between the DC power terminals of the external power storage/discharge element and the terminals of the DC intermediate power bus of the power module.

20 Claims, 3 Drawing Sheets

(51) Int. Cl.
    *H02M 5/458*      (2006.01)
    *H02M 3/04*       (2006.01)
    *H02M 7/5387*     (2007.01)

(52) U.S. Cl.
    CPC .... *H02M 7/5387* (2013.01); *H02M 2001/123* (2013.01)

(56) References Cited

FOREIGN PATENT DOCUMENTS

| | | |
|---|---|---|
| CN | 101669274 A | 3/2010 |
| CN | 202221964 U | 5/2012 |
| CN | 104065259 A | 9/2014 |
| CN | 104979852 A | 10/2015 |
| DE | 102008026870 A1 * | 12/2009 .............. H02M 1/14 |
| DE | 102008026870 A1 | 12/2009 |
| EP | 2525482 A1 | 11/2012 |

* cited by examiner

FILTERING ARRANGEMENT HAVING A THREE PHASE LCL POWER SUPPLY COMMON MODE FILTER

CROSS-REFERENCE TO RELATED APPLICATION

This application is a National Stage application of International Patent Application No. PCT/EP2015/080188, filed on Dec. 17, 2015, which is hereby incorporated by reference in its entirety.

TECHNICAL FIELD

The present invention relates to a filtering arrangement for power electronics devices connected to power storage/discharge elements. More particularly, the invention is related to a regenerative AC/AC converter with a connection from its intermediate DC power bus to an external DC voltage source.

BACKGROUND

A normal method to adjust AC motor shaft rotation speed is to adjust the supplying voltage magnitude and frequency by a frequency converter (FC). Prevailing FC technology is called PWM (pulse width modulation), wherein the device is comprised of a rectifier for mains voltage rectification, a filtered DC voltage intermediate power bus and an inverter bridge for generating the output voltage. The output voltage consists of pulses formed by fast power electronic switches, normally IGBTs (insulated gate bipolar transistors). A similar inverter unit as used in motor side may also be used in mains side e.g. in cases where the motor may work in generator mode and the generated power is desirable to supply back to the mains. This kind of regenerative system is called as regenerative AC/AC converter in this document.

An external power supply/storage element may be connected in the DC intermediate power bus of a FC e.g. for a redundant power supply in case of mains power malfunction. This kind of power element may be e.g. a battery, a photovoltaic power plant, a fuel cell generator etc.

A problem caused by a frequency converter, especially when comprised a regenerative mains bridge connected to a grounded network, may be the common mode voltage in the DC intermediate power bus. The fast switching speed of an IGBT, in combination with a possible resonance in connecting cables may generate hazardous voltage spikes across the insulation from the external power supply/storage element to ground, thus shortening the lifetime of the insulation layers.

The problem may be avoided by using a dedicated transformer between the mains power grid and the frequency converter, but this method increases a considerably amount of the installation costs.

SUMMARY

The object of the present invention is to avoid the problems of prior art by presenting a novel solution, which reduces the stress for insulations of external power supply/storage elements connected to the DC intermediate power bus of a regenerative AC/AC converter. The objective is achieved by what is stated in independent claims, other preferred embodiments are disclosed in the dependent claims.

The characteristic feature of the filter arrangement according to the present invention is that a common mode inductor is connected between the DC intermediate power bus and the external power supply/storage element.

In one embodiment of the invention, the filter arrangement comprises at least a first capacitor arrangement in star-coupling such that the first terminals of the capacitors are connected to the middle points of a LCL filter phase inductors and the second terminals of the capacitors are connected to the first pole of the external power supply/storage element, either directly or via a filter capacitor. Further, the filter arrangement may comprise a second star-coupled capacitor arrangement which is connected respectively as the first capacitor arrangement between the middle points of LCL filter phase inductors and the second pole of the external power supply/storage element.

The effect of the filtering arrangement according to the present invention is that it stabilizes the potential of the external power supply/storage element by reducing potential oscillations between the external power supply/storage element and the ground considerably, when compared to the corresponding potential oscillations at the other side of the common mode inductor, i.e. between the DC intermediate power bus and the ground. Thus the high voltage spikes which may be hazardous to the insulations of the external devices will be avoided. The technical solution according to the present invention, when compared to the prior art technology of using a dedicated mains transformer, is much less expensive e.g. due to the fact that the common mode inductor needs only to be dimensioned according to the current supplied by the external device, but not according to the mains current of the AC/AC converter.

The invention is defined in more detail in the present description and the following examples of embodiments. The scope of protection is defined in the independent claims and the preferred embodiments in other claims.

BRIEF DESCRIPTION OF THE DRAWINGS

Below the invention appears a more detailed explanation using examples with references to the enclosed figures, wherein.

DETAILED DESCRIPTION

Figure 1:
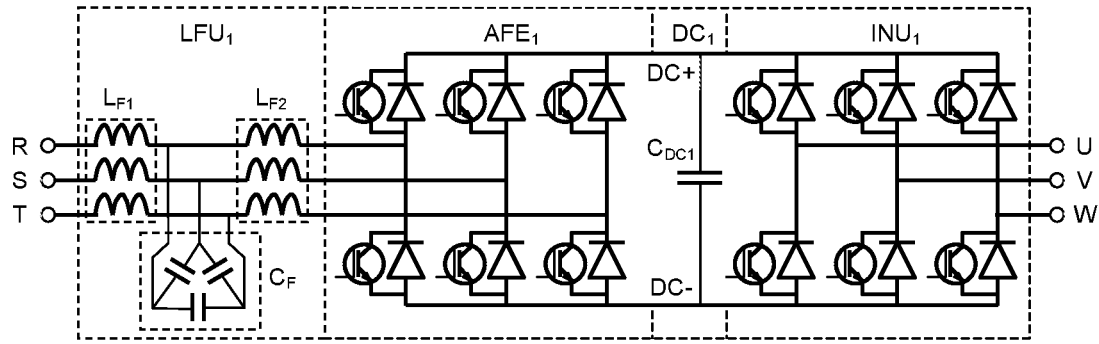
FIG. 1 presents a main circuit of a regenerative AC/AC converter.

FIG. 1 presents a simplified main circuit diagram of a known and typical regenerative AC/AC converter as an example of power device arrangement wherein the filtering arrangement according to the present invention may be applied.

In the example the converter comprises of an active mains bridge $AFE_1$, which is able to feed power in both directions between the 3-phase mains network R, S, T, and the intermediate DC-circuit $DC_1$. $AFE_1$ is connected to the mains via a so-called LCL line filter unit $LFU_1$, comprising of a first 3-phase inductor unit $LF_1$, a second 3-phase inductor unit $LF_2$, and a capacitor unit $C_F$. The inductor units $LF_1$, $LF_2$, may comprise either one 3-phase inductor (coils wounded around a common core part) or three separate 1-phase inductors. Inverter unit $INU_1$ creates, from the direct voltage circuit $DC_1$ which is filtered by a capacitor $C_{DC1}$, an adjustable 3-phase output voltage U, V, W, e.g. for supplying an AC motor.

Both $AFE_1$ and $INU_1$ bridges are similar, both consisting of 3 phase switches which are able to connect the phase terminal to either pole DC+, DC−, of the DC intermediate circuit $DC_1$. One phase switch comprises of upper leg power components (a controllable switch type component, normally IGBT, with an anti-parallel-connected diode) connected to DC+ and similar power components in lower leg, connected to DC−. The operation principle on how this type of bridge operates is called PWM (pulse width modulation).

Figure 2:
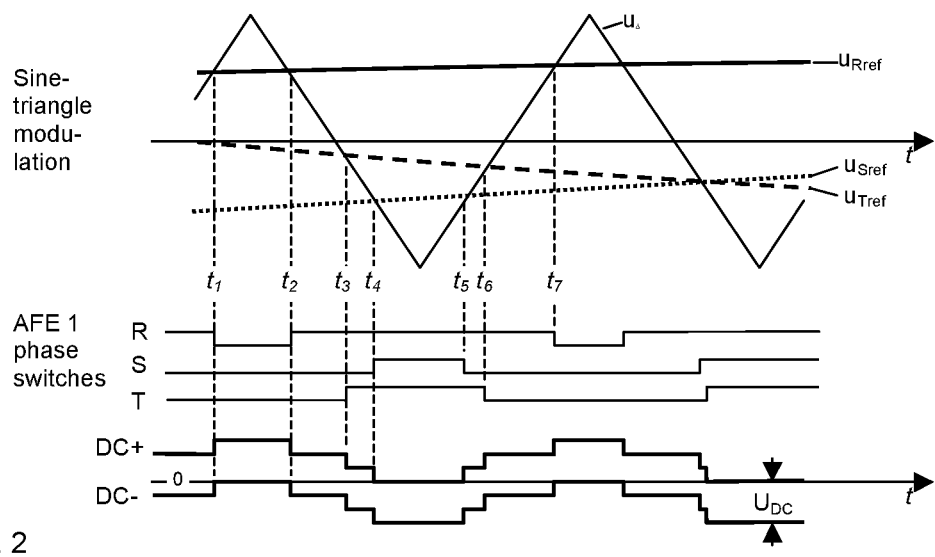
FIG. 2 illustrates modulation and voltages in an inverter bridge.

FIG. 2 illustrates a known and commonly used PWM modulation method, so-called sine-triangle wave comparison, which is used to determine how the active IGBT components of PWM-bridges, in this case of $AFE_1$, are controlled. In the method phase specific sinusoidal reference signals ($u_{Rref}$, $u_{Sref}$, $u_{Tref}$) are compared to a common triangular signal $u_\Delta$. When the instantaneous value of the sinusoidal signal is higher than that of the triangular wave, the upper leg IGBT is turned on, and vice versa. E.g. at time instant $t_1$ the value of $u_\Delta$ exceeds the value of $u_{Rref}$ which causes that the R-phase switch is turned from the upper position to the lower position, etc.

The lower part of FIG. 2 illustrates the principal waveform of the DC intermediate circuit potential when the mains supply is grounded (ground potential marked as 0). Between time instants $t_1$ and $t_2$, when all phases of $AFE_1$ are in lower position, the DC− pole of the intermediate circuit $DC_1$ is at 0 potential (due to that the sum of mains phase currents and phase current gradients is always 0 when the output side of the converter is ungrounded). Similarly, between $t_4$ and $t_5$ all phases are in upper position causing DC+ pole to stay at 0 potential, and when the phase switches are in different positions the DC intermediate circuit potential is between these maximum positions as illustrated in FIG. 2.

Due to stray component values, e.g. stray capacitances between main circuit and grounded frame, and serial stray inductances in current conductors, the potential changes of DC intermediate circuit is in practice not as clean as illustrated in FIG. 2, but includes some transient oscillation with voltage overshoots after each potential step. This phenomenon may be amplified due to resonances, especially at the end of an external device connected by a long cable to the DC circuit, resulting voltage spikes which may be hazardous to insulations.

Figure 3:
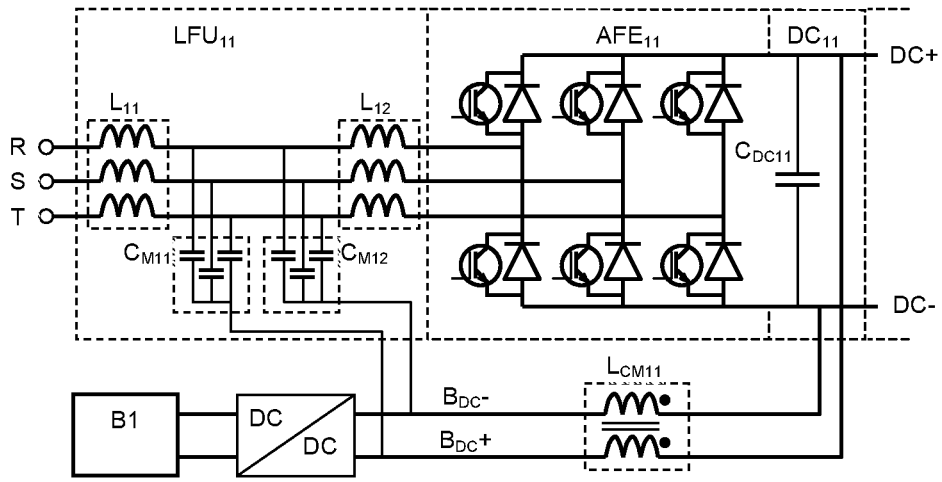
FIG. 3 presents a first embodiment of a filtering arrangement according to the present invention.

FIG. 3 presents an exemplary embodiment of a filtering arrangement according to the present invention, used for reducing transient oscillation between the electric potential between the main circuit of an external device B1, connected to the intermediate power bus $DC_{11}$, and the ground. The DC power bus $DC_{11}$ in this example belongs to a similar regenerative AC/AC converter as presented in FIG. 1, but for simplicity the inverter unit and the capacitor unit $C_F$ of the LCL filter are not presented here.

A voltage regulator (marked as DC/DC in the figure) may be used between the external device B1 and the DC power bus of a converter in order to match the voltage levels.

The filtering arrangement comprises a common-mode inductor $LCM_{11}$, connected between the DC intermediate power bus of the converter ($DC_{11}$, poles DC+ and DC−) and the DC connectors of the external device (poles $B_{DC+}$ and $B_{DC-}$). Further, the arrangement comprises a first capacitor arrangement $C_{M11}$, consisting of three star-connected capacitors such that in each phase the first terminal of the phase-specific capacitor is connected to the connection point of LCL-filter inductors $L_{11}$, $L_{12}$, and the second terminals of the capacitors are connected to the positive pole $B_{DC+}$ of the external device. Further, the arrangement comprises a second capacitor arrangement $C_{M12}$, consisting of three star-connected capacitors such that in each phase the first terminal of the phase-specific capacitor is connected to the connection point of LCL-filter inductors $L_{11}$, $L_{12}$, and the second terminals of the capacitors are connected to the negative pole $B_{DC-}$ of the external device. The second terminals of the capacitors can be connected directly to the negative pole $B_{DC-}$ of the external device.

Figure 4A:
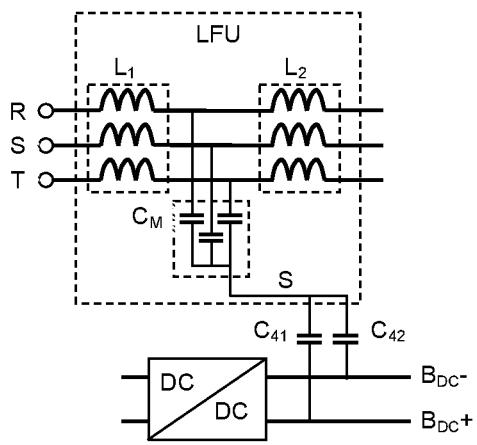
FIGS. 4A and 4B present other embodiments of a filtering arrangement according to the present invention.

FIG. 4A presents another embodiment of the present invention, comprising only one star-coupled capacitor arrangement $C_M$. It is connected similarly to e.g. $C_{M11}$ in FIG. 3 to the LCL-filter ($L_1$, $L_2$) but the star point S of the capacitors is here connected to both external device poles $B_{DC+}$, $B_{DC-}$ via capacitors $C_{41}$ and $C_{42}$.

Figure 4B:
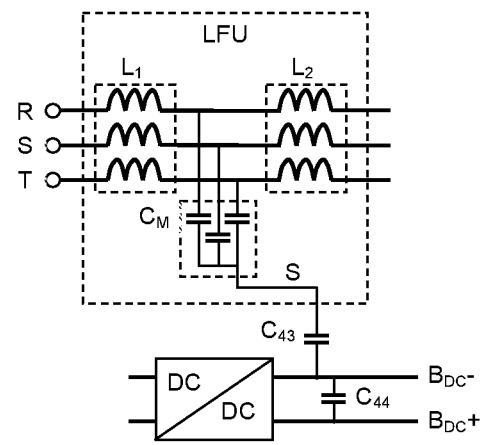

FIG. 4B presents another embodiment of the present invention, comprising one star-coupled capacitor arrangement $C_M$ which is connected to the LCL-filter ($L_1$, $L_2$) like presented in FIG. 4A, but here the star point S of the capacitors is connected only to one of the external device pole $B_{DC-}$ via a capacitor $C_{43}$. In this embodiment the poles $B_{DC+}$, $B_{DC-}$, of the external device are connected by a capacitor $C_{44}$.

As in the case of embodiment of FIG. 3, a voltage regulator (marked as DC/DC in the figure) may be used between the external device and the DC power bus of a converter in order to match the voltage levels.

Figure 5A:
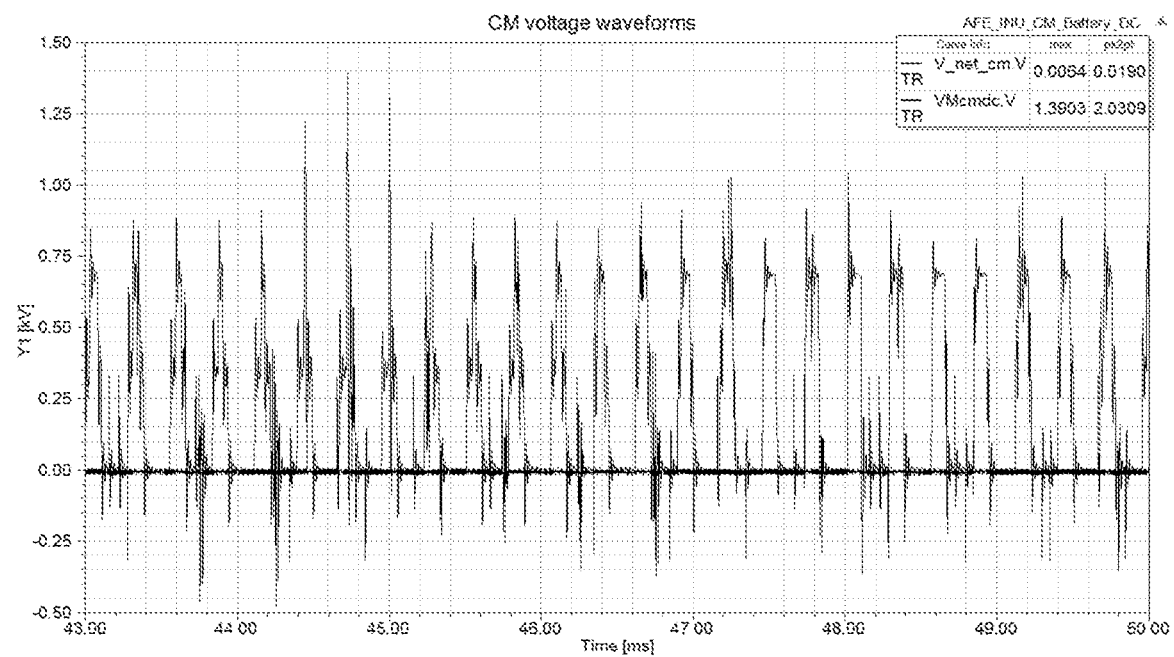
FIG. 5A illustrates voltages between an external device connected to the intermediate DC bus of a regenerative AC/AC converter and ground, without a filtering arrangement according to the present invention.
Figure 5B:
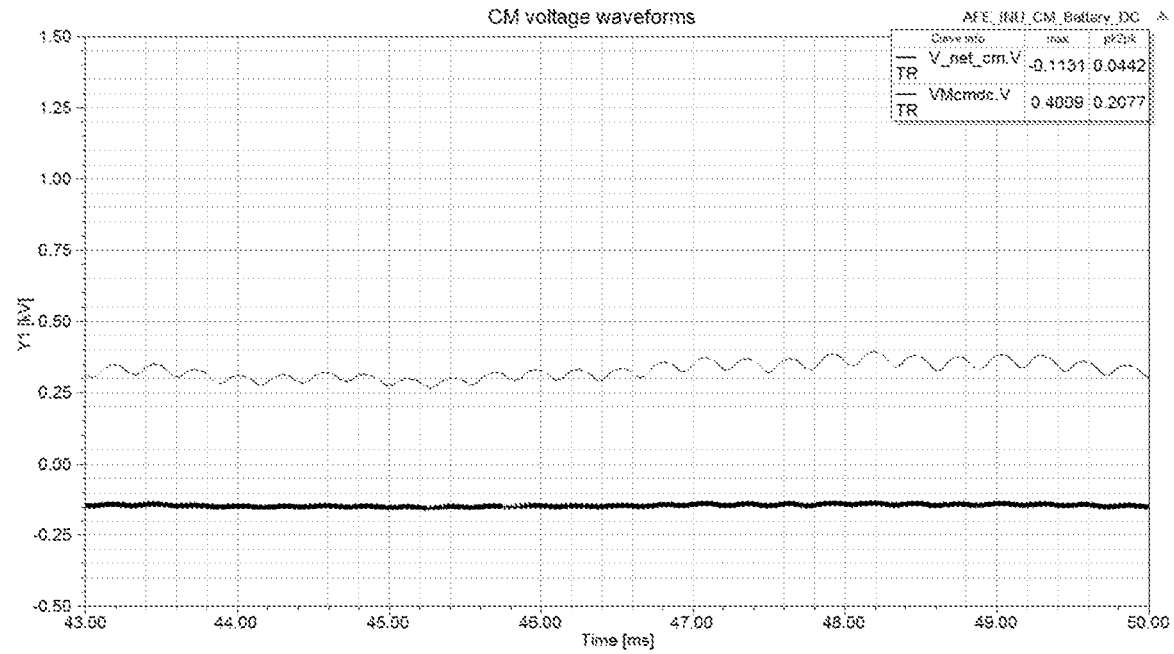
FIG. 5B illustrates voltages between an external device connected to the intermediate DC bus of a regenerative AC/AC converter and ground, with a filtering arrangement according to the present invention.

FIGS. 5A and 5B illustrate the effect of a filter according to the present invention, as relative values wherein 1 corresponds the voltage of the intermediate power bus. FIG. 5A illustrates the common mode voltage without filter, i.e. the voltage between DC+ and ground. It can be seen that the voltage fluctuates very sharply at high amplitude, with peak to peak value about 2.0 and the maximum spikes reaching about 1.4. FIG. 5B respectively illustrates the common mode voltage with a filtering arrangement according to the present invention, i.e. the voltage between $B_{DC+}$ and ground (see FIG. 3). Now the voltage fluctuation is very limited, peak to peak value only about 0.2 and the spikes staying below 0.4.

While the invention has been described with reference to the previous embodiment, it should be recognized that the invention is not limited to this embodiment, but many modifications and variations will become apparent to persons skilled in the art without departing from the scope of the invention, as defined in the appended claims.

What is claimed is:

1. A filtering arrangement for a system comprising a power electronics device and an external power supply and storage element, the power electronics device comprises a power module and a three-phase filter between AC power terminals of the power module and a supplying AC power grid, and the power module comprises a DC intermediate power bus, and the three-phase filter between the AC power terminals and the supplying AC power grid comprises two three-phase inductors, and the external power supply and storage element has two DC power terminals which are connected to the DC intermediate power bus of the power electronics device, wherein:

the filtering arrangement comprises a common mode inductor which is connected between the DC power terminals of the external power supply and storage element and terminals of the DC intermediate power bus of the power module.

2. The filtering arrangement according to claim 1, further comprising:

a first capacitor arrangement comprising three capacitors in star-coupling arranged such that first terminals of the capacitors of the first capacitor arrangement are connected to phase-specific middle points of the three-phase inductors of the three-phase filter and second terminals of the capacitors of the first capacitor arrangement are connected together forming a star-point, and wherein the star-point of the first capacitor arrangement is connected to a first pole of the external power supply and storage element.

3. The filtering arrangement according to claim 2, wherein the star-point of the first capacitor arrangement is connected to the first pole of the external power supply and storage element directly.

4. The filtering arrangement according to claim 3, further comprising:

a second capacitor arrangement comprising three capacitors in star-coupling arranged such that first terminals of the capacitors of the second capacitor arrangement are connected to the phase-specific middle points of the three-phase inductors of the three-phase filter and second terminals of the capacitors of the second capacitor arrangement are connected together forming a star-point, and wherein the star-point of the second capacitor arrangement is connected to a second pole of the external power supply and storage element.

5. The filtering arrangement according to claim 3, further comprising: a voltage regulator between the external power supply and storage element and the DC intermediate power bus of the power electronics device.

6. The filtering arrangement according to claim 2, wherein the star-point of the first capacitor arrangement is connected to the first pole of the external power supply and storage element via a first additional capacitor.

7. The filtering arrangement according to claim 6, wherein the star-point of the first capacitor arrangement is connected to a second pole of the external power supply and storage element via a second additional capacitor.

8. The filtering arrangement according to claim 7, further comprising: a voltage regulator between the external power supply and storage element and the DC intermediate power bus of the power electronics device.

9. The filtering arrangement according to claim 6, wherein the first pole of the external power supply and storage element and a second pole of the external power supply and storage element are connected by a second additional capacitor.

10. The filtering arrangement according to claim 9, further comprising: a voltage regulator between the external power supply and storage element and the DC intermediate power bus of the power electronics device.

11. The filtering arrangement according to claim 6, further comprising:

a second capacitor arrangement comprising three capacitors in star-coupling arranged such that first terminals of the capacitors of the second capacitor arrangement are connected to the phase-specific middle points of the three-phase inductors of the three-phase filter and second terminals of the capacitors of the second capacitor arrangement are connected together forming a star-point, and wherein the star-point of the second capacitor arrangement is connected to a second pole of the external power supply and storage element.

12. The filtering arrangement according to claim 6, further comprising: a voltage regulator between the external power supply and storage element and the DC intermediate power bus of the power electronics device.

13. The filtering arrangement according to claim 2, further comprising:

a second capacitor arrangement comprising three capacitors in star-coupling arranged such that first terminals of the capacitors of the second capacitor arrangement are connected to the phase-specific middle points of the three-phase inductors of the three-phase filter and second terminals of the capacitors of the second capacitor arrangement are connected together forming a star-point, and wherein the star-point of the second capacitor arrangement is connected to a second pole of the external power supply and storage element.

14. The filtering arrangement according to claim 13, further comprising: a voltage regulator between the external power supply and storage element and the DC intermediate power bus of the power electronics device.

15. The filtering arrangement according to claim 2, further comprising: a voltage regulator between the external power supply and storage element and the DC intermediate power bus of the power electronics device.

16. The filtering arrangement according to claim 1, further comprising:

a voltage regulator between the external power supply and storage element and the DC intermediate power bus of the power electronics device.

17. The filtering arrangement according to claim 1, wherein the external power supply and storage element is configured to supply power to the power electronics device when there is a malfunction with the supplying AC power grid.

18. A filtering arrangement for a system, the system comprising:

a power electronics device comprising a power module and a three-phase filter, the power electronics device connected to a first set of AC power terminals;

an inverter unit connected to a second set of AC power terminals;

a DC intermediate power bus connected to the power electronics device and the inverter unit; and an external power supply and storage element;

wherein the three-phase filter comprises two three-phase inductors;
wherein the three-phase filter is arranged between the first set of AC power terminals and a supplying AC power grid; and
wherein the external power supply and storage element has two DC power terminals connected to the DC intermediate power bus;
the filtering arrangement comprising:
a common mode inductor connected between the two DC power terminals and terminals of the DC intermediate power bus.

19. A system comprising:
a power electronics device comprising a power module and a three-phase filter, the power electronics device connected to a first set of AC power terminals;
an inverter unit connected to a second set of AC power terminals;
a DC intermediate power bus connected to the power electronics device and the inverter unit and arranged between the power electronics device and the inverter unit;
an external power supply and storage element having two DC power terminals connected to the DC intermediate power bus; and
a filtering arrangement comprising a common mode inductor connected between the two DC power terminals and terminals of the DC intermediate power bus;
wherein the three-phase filter comprises two three-phase inductors; and
wherein the three-phase filter is arranged between the first set of AC power terminals and a supplying AC power grid.

20. The system according to claim 19, wherein the filtering arrangement further comprises:
a first capacitor arrangement comprising three capacitors in star-coupling arranged such that first terminals of the capacitors of the first capacitor arrangement are connected to phase-specific middle points of the three-phase inductors of the three-phase filter between the two three-phase inductors, and second terminals of the capacitors of the first capacitor arrangement are connected together forming a star-point;
wherein the star-point of the first capacitor arrangement is connected to a first pole of the external power supply and storage element.

* * * * *